April 13, 1965 J. FAURE-HERMAN 3,177,710
METER FOR FLUIDS
Filed June 13, 1961
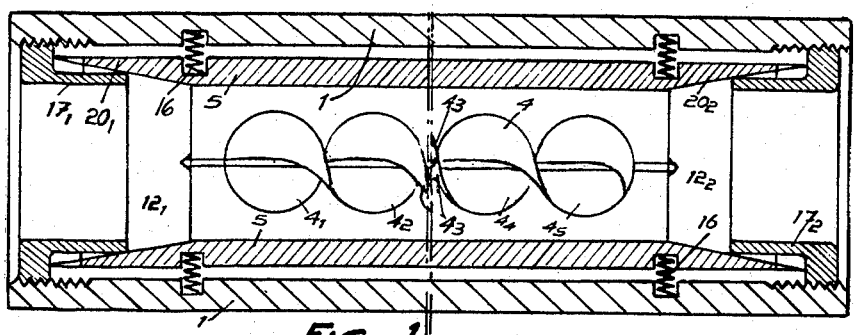
Fig. 1
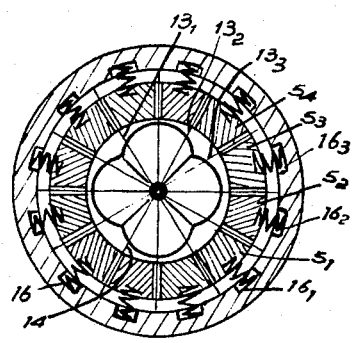
Fig. 2
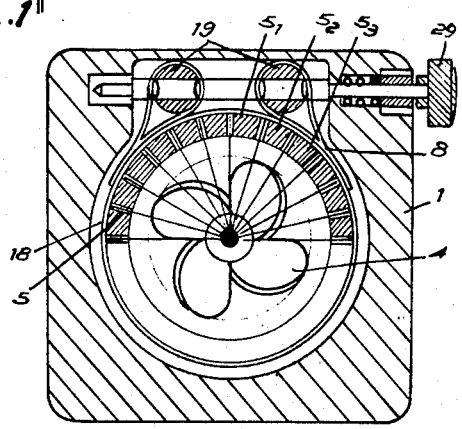
Fig. 3
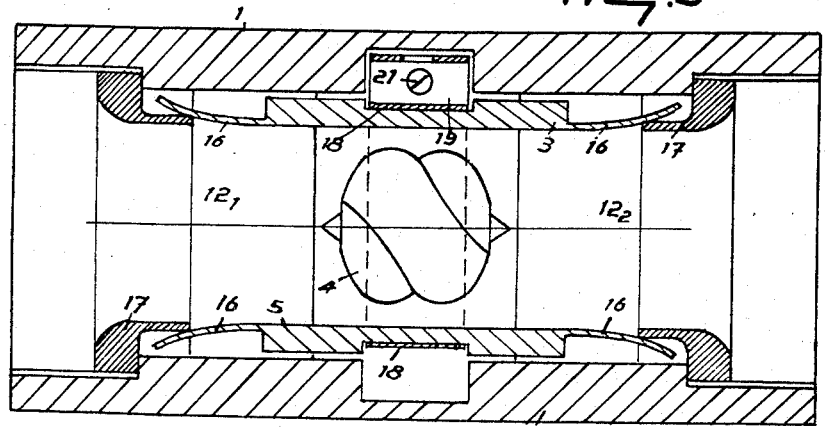
Fig. 4
Fig. 5
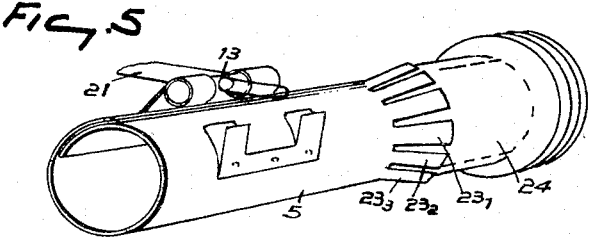

United States Patent Office 3,177,710
Patented Apr. 13, 1965

3,177,710
METER FOR FLUIDS
Jean Faure-Herman, 68 Rue de l'Est,
Boulogne-sur-Seine, France
Filed June 13, 1961, Ser. No. 129,921
Claims priority, application France, June 18, 1960,
830,466, Patent 1,260,370
3 Claims. (Cl. 73—230)

The present invention has for its object the producing of a turbine meter for fluid (liquid or gas) in which the screw revolves at a speed proportional to the flow in volume of the fluid.

Another object of the invention is to provide means enabling the section of the nozzle of the turbine to be varied as a function of the density of the fluid or of various external factors that may intervene on the value of this density and thus obtain the mass value of the flow of the fluid.

Another object of the invention is to produce a nozzle that can be regulated so as to modify its section.

Another object of the invention is to provide devices which by acting on the members forming the nozzle enable the section of this nozzle to be regulated.

Other objects and advantages will be revealed in the following description and attached drawings, in which:

FIGURES 1 and 2 respectively show in longitudinal and cross-section a first form of embodiment of the meter for fluid.

FIGURES 3 and 4 respectively show in longitudinal and cross section a second form of embodiment of the meter for fluid.

FIGURE 5 shows in perspective another form of embodiment of the variable section nozzle.

In the meter shown in FIGURES 1 to 5, the metering of the volumetric flow takes place by counting the revolutions of the screw 4 which may be simple or multiple.

This screw 4 is in a variable section or length of nozzle 5 which has a uniform diameter but whose diameter can be varied in function, for example, of the density of the fluid to convert into mass flow information the metering of the volume flow given by the rotation of the screw.

In the meter for fluid shown in FIGURES 1 and 2, the cylindrical nozzle 5 is formed directly by individual independent segments $5_1$, $5_2$, $5_3$ etc. provided in the bore of the body 1 of the meter. These segments are, for example, obtained by longitudinally cutting a cylindrical nozzle with internal diameter equal to that of the smallest section anticipated for the meter and widened at the ends; the external diameter of this nozzle is appreciably less than the diameter of the bore of the body 1. The number of segments $5_1$, $5_2$, etc. thus obtained can be of any kind. Nevertheless, it is advisable to place rectifying elements $12_1$, $12_2$ at the input and output of the fluid on either side of the screw formed by diametrical planes $13_1$, $13_2$, $13_3$ and (FIGURE 2) having the particular purpose of straightening the trickles of fluid before their action on the screw so as to make them parallel to the longitudinal axis of the nozzle. In the case where the screw 4 comprises several elements $4_1$, $4_2$, $4_3$ straightening elements are provided between each screw element.

In these conditions, the number of segments $5_1$, $5_2$, etc. of the cylindrical nozzle 5 is equal to the number of planes 13 of radial straightening of the straighteners 12 and these planes pass between the interstices provided between the segments $5_1$, $5_2$ of the nozzle 5.

At each end of each segment $5_1$, $5_2$, etc. there are springs $16_1$, $16_2$, $16_3$, etc. which press against the internal wall of the body 1 of the flow-meter and tend to diminish the diameter of the nozzle. In each widened end $20_1$ and $20_2$ of the nozzle adjustment sockets $17_1$ and $17_2$ are more or less inserted by screwing on the body 1 of the flow-meter.

The variation of the section of the cylindrical nozzle 5 thus formed takes place in the following manner:

The sockets $17_1$ and $17_2$ are screwed in on which the segments $5_1$, $5_2$, $5_3$ etc. press by the action of springs $16_1$, $16_2$, $16_3$, etc. These sockets thus force themselves into the cylindrical nozzle 5 bearing on the widened ends $20_1$ and $20_2$ causing the segments $5_1$, $5_2$, $5_3$, etc. of the nozzle to open out owing to the increase in the section of this nozzle 5. By unscrewing the sockets $17_1$, $17_2$ the section of the nozzle diminishes owing to the action of the springs $16_1$, $16_2$, $16_3$, etc. which press the segments on to the sockets $17_1$ and $17_2$.

FIGURES 3 and 4 show another form of embodiment of the meter for fluid in which the variable nozzle 5 also comprises segments $5_1$, $5_2$, $5_3$, etc. This alternative enables the passage section to be regulated from the outside. To this end, the recoil springs 16 have the shape of leaves extending on each side of the segments $5_1$, $5_2$ and acting in the reverse manner from the preceding example, i.e., by pressing on the sockets 17, they tend to increase the diameter of the adjustable nozzle. A securing collar 18 with nuts 19 controlled from the outside by a screw 21 and surrounding the nozzle, limits the action of the springs 16 to the suitable passage diameter. The output fluid-tightness of the screw 21 is ensured by seal-tight rings 22.

In FIGURE 5 the variable cylindrical nozzle 5 is formed by a rolled resilient steel sheet in a tubular configuration to make a variable section cylinder according to the degree of winding on itself of the sheet. Two nuts 19 and the screw 21 enable its section to be regulated in the same manner as in the preceding example (FIGURES 3 and 4). The ends of the cylinder are split up into resilient laminae $23_1$, $23_2$, $23_3$ etc. so as to enable connecting up on a piping 24 of unvarying section.

What I claim is:

1. Meter for fluid comprising a cylindrical nozzle formed from a plurality of independent, cylindrical segments, turbine means disposed in the nozzle and adapted to revolve at a speed proportional to the speed of the fluid flowing in the nozzle, means for moving said segments radially of the longitudinal axis of the nozzle for selectively increasing and decreasing the diameter of the nozzle, whereby to change the speed of the fluid in the nozzle and thereby the rotational speed of the turbine means, said segments having a widened internal surface at their ends, and said means for moving said segments comprising socket means engaging with the widened ends of the segments and being axially movable in said nozzle while in engagement with said widened ends, whereby the longitudinal displacement of said socket means causes the selective radial movement of said segments toward and away from the longitudinal axis of the nozzle whereby selectively to increase and decrease the diameter of the nozzles, and springs acting on said segments to keep them in engagement with the socket means.

2. Meter for fluid comprising a cylindrical nozzle formed from a plurality of independent, cylindrical segments, turbine means disposed in the nozzle and adapted to revolve at a speed proportional to the speed of the fluid flowing in the nozzle, means for moving said segments radially of the longitudinal axis of the nozzle for selectively increasing and decreasing the diameter of the nozzle, whereby to change the speed of the fluid in the nozzle and thereby the rotational speed of the turbine means, leaf springs extending the ends of each one of said cylindrical segments, said springs tending to separate the segments from each other, and said means for moving said segments comprising a radially-adjustable securing collar surrounding all of said segments, socket means engaging with the leaf springs extending the ends of the cylindrical segments and holding the springs against the action of the securing collar, whereby adjustment of the securing collar effects a change in the diameter of the nozzle.

3. Meter for fluid comprising a cylindrical nozzle formed from a plurality of independent, cylindrical segments, turbine means disposed in the nozzle and adapted to revolve at a speed proportional to the speed of the fluid flowing in the nozzle, means for moving said segments radially of the longitudinal axis of the nozzle for selectively increasing and decreasing the diameter of the nozzle, whereby to change the speed of the fluid in the nozzle and thereby the rotational speed of the turbine means, leaf springs extending the ends of each one of said cylindrical segments, said springs tending to separate the segments from each other, and said means for moving said segments comprising a radially-adjustable securing collar surrounding all of said segments, socket means engaging with the leaf springs extending the ends of the cylindrical segments and holding the springs against the action of the securing collar, whereby adjustment of the securing collar effects a change in the diameter of the nozzle, and screw means for controlling the securing collar from outside of the meter.

References Cited by the Examiner

UNITED STATES PATENTS

| 1,915,705 | 6/33 | Webb. | |
| 2,925,251 | 2/60 | Arps. | |
| 2,944,421 | 7/60 | Case et al. | 73—230 |
| 2,985,454 | 5/61 | Stoner | 279—2 |

FOREIGN PATENTS

| 1,108,314 | 8/55 | France. |
| 104,152 | 7/99 | Germany. |
| 733,680 | 4/43 | Germany. |
| 799,996 | 8/58 | Great Britain. |

RICHARD C. QUEISSER, *Primary Examiner.*

ROBERT L. EVANS, DAVID SCHONBERG,
*Examiners.*